(12) United States Patent
Eck

(10) Patent No.: US 6,578,417 B1
(45) Date of Patent: Jun. 17, 2003

(54) FILLING LEVEL SENSOR

(75) Inventor: Karl Eck, Frankfurt am Main (DE)

(73) Assignee: Mannesmann VDO AG, Frankfurt am Main (DE)

( * ) Notice: Subject to any disclaimer, the term of this patent is extended or adjusted under 35 U.S.C. 154(b) by 108 days.

(21) Appl. No.: 09/661,218

(22) Filed: Sep. 14, 2000

(30) Foreign Application Priority Data

Sep. 15, 1999 (DE) .......................................... 199 44 330

(51) Int. Cl.$^7$ ................................................. G01F 23/56
(52) U.S. Cl. ...................... 73/305; 73/314; 73/DIG. 5; 73/317; 340/625
(58) Field of Search .............................. 73/314, DIG. 5, 73/317, 305; 340/625

(56) References Cited

U.S. PATENT DOCUMENTS

| | | | | |
|---|---|---|---|---|
| 1,611,480 A | * | 12/1926 | Meroni ........................ 338/33 |
| 2,325,582 A | * | 8/1943 | Andersen ..................... 73/317 |
| 4,746,776 A | * | 5/1988 | Komaniak ................. 200/84 R |
| 5,090,212 A | | 2/1992 | Keltner et al. |
| 5,117,693 A | | 6/1992 | Duksa |
| 6,089,086 A | * | 7/2000 | Swindler et al. .............. 73/317 |
| 6,253,609 B1 | * | 7/2001 | Ross, Jr. et al. .............. 73/305 |

FOREIGN PATENT DOCUMENTS

| DE | 32 33 936 | 3/1984 | .......... G01F/23/12 |
|---|---|---|---|
| DE | 196 48 539 | 6/1998 | ............ G01B/7/00 |

* cited by examiner

Primary Examiner—Daniel S. Larkin
Assistant Examiner—André K. Jackson

(57) ABSTRACT

A filling level sensor for a liquid container such as a fuel tank for a motor vehicle includes a lever arm having a first end on which a float is mounted and a second end mounted in a support part. A contactless magnetic sensor and a magnetic device are arranged so that the magnetic device moves in response to a deflection of the lever arm due to a change in fill level in the tank and the movement of the magnetic device changes a magnetic field acting on the magnetic sensor so that the magnetic sensor supplies an output signal corresponding to the filling level in the fuel container.

9 Claims, 3 Drawing Sheets

FILLING LEVEL SENSOR

BACKGROUND OF THE INVENTION

1. Field of the Invention

The invention relates to a filling level sensor for a liquid container such as a fuel tank in a motor vehicle having a lever arm which supports a float and whose pivot movement is converted into an electrical output signal corresponding to the filling level of the liquid in the container.

2. Description of the Related Art

Lever-type fill level transmitters having a lever arm with a float fixed thereto are often used in fuel tanks and are known. The known lever-type transmitters are typically fixed to a structural part in the fuel tank, e.g. a conveying unit. The known lever-type transmitter further comprises a support part on which a ceramic with a thick-film resistor network is arranged. A sliding-action contact connected to the lever arm sweeps over the resistor network to generate an electrical signal corresponding to the filling level dependent on the pivot movement. The disadvantage of these lever-type transmitters is that the resistor network is arranged in the fuel and, consequently, has to be resistant to said fuel. Furthermore, the sliding-action contact is subject to wear. Moreover, these known lever-type transmitters do not have diagnosis capability. That is, changes in the measured values caused by deposits or similar effects cannot be identified. Accordingly, these changes in measured values over time cause the output signal to deviate so that it no longer corresponds to the actual filling level.

To avoid corrosion and wear on the sensor of the lever-type transmitter, it is known to use sensors which operate contactlessly such as, for example, reed contacts for filling level measurement. In a fill level transmitter having reed contacts, one or more reed contacts are arranged as part of an evaluation circuit in the liquid container and a float bearing a magnet is arranged in a movable manner along the reed contacts. The reed contact located proximate to the float is closed via the magnetic field of the magnet. A corresponding electrical signal is obtained by the evaluation circuit at this reed contact which corresponds to the respective filling level. A problem with filling level sensors of this type is that they require a complicated configuration because plural sensors must be arranged in a distributed manner over the entire height of the liquid container. The arrangement of plural sensors requires a relatively large volume which has a negative effect on the remaining useful volume of the container.

SUMMARY OF THE INVENTION

An object of the present invention is to provide a filling level sensor for a liquid container which is constructed in a simple manner and in which the sensor does not contact the medium. Furthermore, the object of the present invention is to provide a filling level sensor for a liquid container in which the filling level sensor is mounted in a simple manner and is mountable in any desired position.

The object is achieved by a filling level sensor for a liquid container comprising a support part, a lever arm having a first end and a second end, wherein the second end is pivotally mounted on the support part, a float arranged at the first end of the lever arm such that the lever arm is pivotally deflectable in response to a change in a filling level in the liquid container, a magnetic sensor having an output signal corresponding to the filling level in the liquid container, and a magnetic device having a magnetic field acting on the magnetic sensor and operatively arranged for moving in response to a pivotal deflection of the lever arm, wherein the magnetic field acting on the magnetic sensor changes during the pivotal deflection of the lever arm and thereby changes the output signal.

According to the present invention, a filling level sensor has a magnetic device with at least one contactless magnetic sensor. A lever arm connected to a float is operatively connected to the magnetic device. The pivotal deflection of the lever arm moves the magnetic device relative to the magnetic sensor so that the magnetic field acting on the magnetic sensor changes in response to the relative movement of the magnetic device. This change in the magnetic field causes a change in the output signal of the magnetic sensor which corresponds to the change in filling level.

The magnetic sensor of this filling level sensor may be encapsulated so that it does not contact the medium in the liquid container. The encapsulation of the magnetic sensor simplifies the detection of the filling level by the lever arm and float and makes the detection cost-effective. As a result, this filling level sensor is particularly suitable for use in measuring the fill level of aggressive media such as fuel for internal combustion engines. A support part in which the lever arm is mounted may be used to fix the filling level sensor to built-in components in the liquid container. However, the filling level sensor may also be inserted into an opening in the liquid container and connected to the container via a flange on the support part. In this arrangement, the magnetic sensor is arranged in the flange. Furthermore, the magnetic sensor may be ventilated so that the magnetic sensor is not attacked even by permeating media in the liquid container.

In a further embodiment, the magnetic device comprises a cam disk connected to the lever arm and composed of a magnetic material. Liquid containers comprising fuel tanks for motor vehicles are typically formed in a complicated manner such that the relationship between filling level and filling quantity in the container is nonlinear. According to the present invention, the pivot movement of the lever arm may be converted into a magnetic sensor output signal corresponding to the filling level liquid containers with a nonlinear tank characteristic if the cam disk is designed in accordance with the tank characteristic. The conversion of the pivot movement of the lever arm by means of a cam disk allows the filling level sensor to be arranged at any desired location in the liquid container. Accordingly, an exclusively upright arrangement of the filling level sensor is not necessary.

Furthermore, the cam disk may further comprise partly magnetized regions or regions having different magnetic polarities so that not only the change in strength but also the change in position of the magnetic field acting on the magnetic sensor produces a magnetic sensor output signal which corresponds to the instantaneous filling level in the liquid container.

In yet another embodiment, the magnetic device includes a magnet movably arranged therein and brought to bear on an end of the cam disk so that a corresponding movement of the cam disk causes the magnet to move linearly with respect to the magnetic sensor. The advantage of this embodiment is that the cam disk may be composed of a plastic, for example, instead of a magnetic material.

To ensure permanent contact between the magnet and the cam disk, the magnet may be brought to bear against the cam disk by the urgency of a spring. This allows the magnet to be arranged in a configuration other than exclusively upright on the cam disk.

In a further embodiment, a plunger is arranged between the magnet and the cam disk. The plunger allows the lever arm and the magnetic sensor to be decoupled spatially, so that the magnetic sensor is arranged in the container wall by means of the flange while the lever arm is arranged with the float at a suitable location in the liquid container.

In a further refined embodiment, the filling level sensor is inserted into an opening in the side wall of the liquid container. In the case of fuel tanks of motor vehicles, this arrangement allows easier accessibility for repair and maintenance work and can be reached without demounting the fuel tank.

By way of example, passive magnetic position sensors, of the kind disclosed in German reference DE 196 48 539 A1, may be used as the contactless magnetic sensor. Furthermore, Hall elements, reed contacts or similar sensors may alternatively be used. These sensors have the advantage that they have a diagnosis capability. By way of example, reference points may be interrogated and/or adjusted by a corresponding electronic unit.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
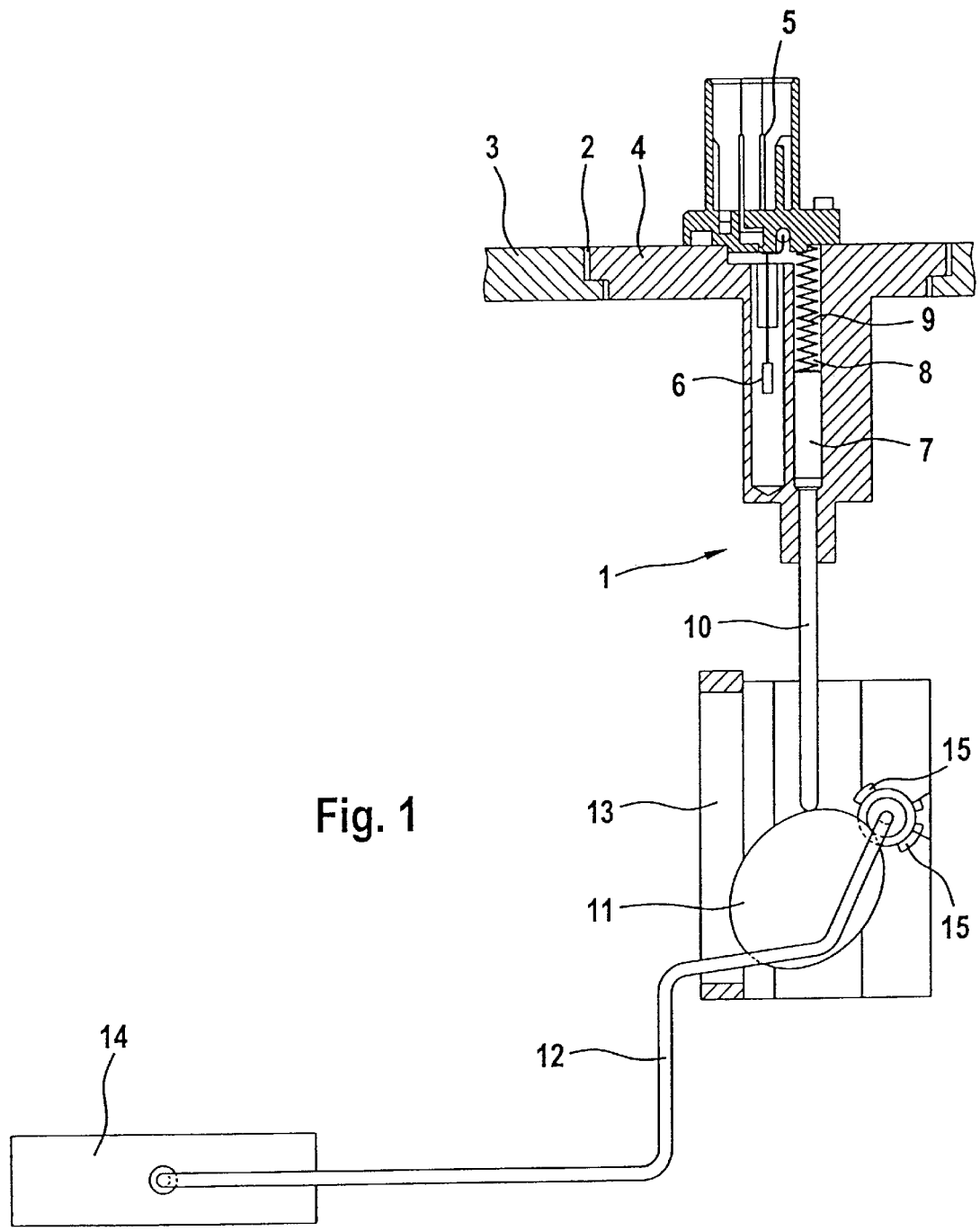
FIG. 1 is a partial side view of a filling level sensor inserted into a liquid container from above according to an embodiment of the present invention.

A filling level sensor 1 illustrated in FIG. 1 is inserted into an opening 2 at the top side of a fuel tank 3 according to an embodiment of the present invention. A flange 4 of the filling level sensor closes the opening 2. A side of the flange 4 facing outward from the fuel tank 3 has connections 5 for a magnetic sensor 6 comprising a Hall element. The magnetic sensor 6 supplies an output signal corresponding to a magnetic field acting on it. A magnet 7 is arranged in a movable manner in a hole 8 in the flange 4 alongside the magnetic sensor 6. The magnet 7 is pretensioned against a plunger 10 by the urgency of a spring 9. The urgency of the spring 9 also holds the plunger 10 in permanent contact with a cam disk 11. A support part 13 is connected to the flange 4. The cam disk 11 is fixedly connected to a lever arm 12 mounted on the support part 13. A float 14 connected to a free end of the lever arm 12 pivotally deflects the lever arm 12 as a function of the filling level. The deflection of the lever arm 12 moves the cam disk 11 which vertically displaces the plunger 10 and the magnet 7. Through this displacement, the magnet 7 is displaced relative to the magnetic sensor 6 so that the magnetic field acting on the magnetic sensor 6 changes. The change in magnet field changes the output signal of the magnetic sensor 6 which corresponds to the change in the filling level. The range of pivot movement of the lever arm 12 is limited by stops 15.

Figure 2:
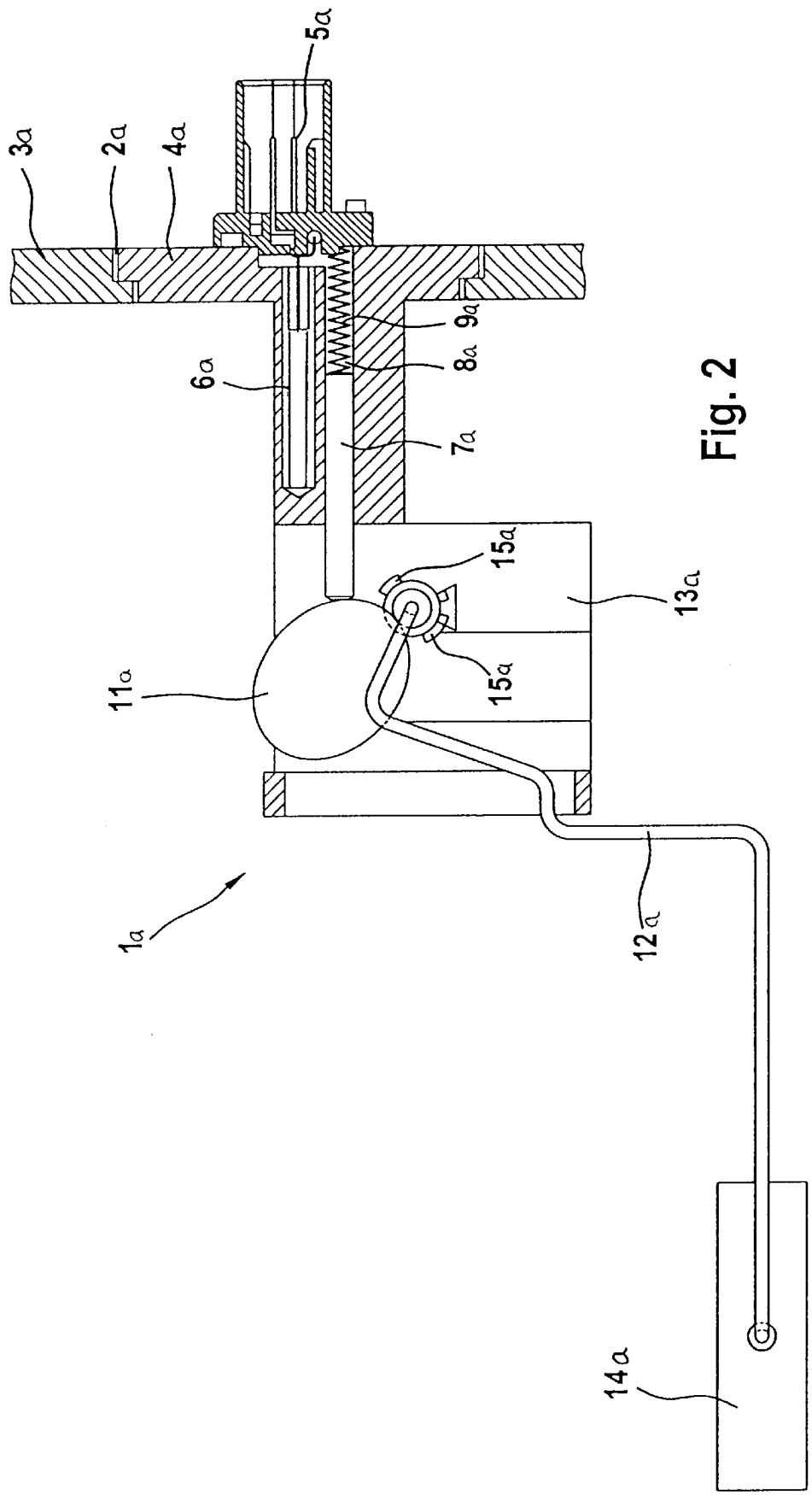
FIG. 2 is a partial side view of a filling level sensor which is inserted into a side wall in a liquid container according to another embodiment of the present invention.

A further embodiment of a filling level sensor 1a is illustrated in FIG. 2 in which parts corresponding to the embodiment in FIG. 1 have the same reference character with a suffix "a". The difference between the embodiments in FIGS. 1 and 2 is that a filling level sensor 1a is inserted into an opening 2a in a side wall of a fuel tank 3a. Furthermore, a magnet 7a is directly connected to a cam disk 11a without the interposition of a further component. The method of operation of the filling level sensor 1a corresponds to that of the filling level sensor described in FIG. 1. In this embodiment the magnetic sensor 6a comprises a reed switch or plurality of reed switches.

The cam disk 11a is designed in accordance with a non linear relationship between the filling level and filling quantity of fuel tank 3a.

Figure 3:
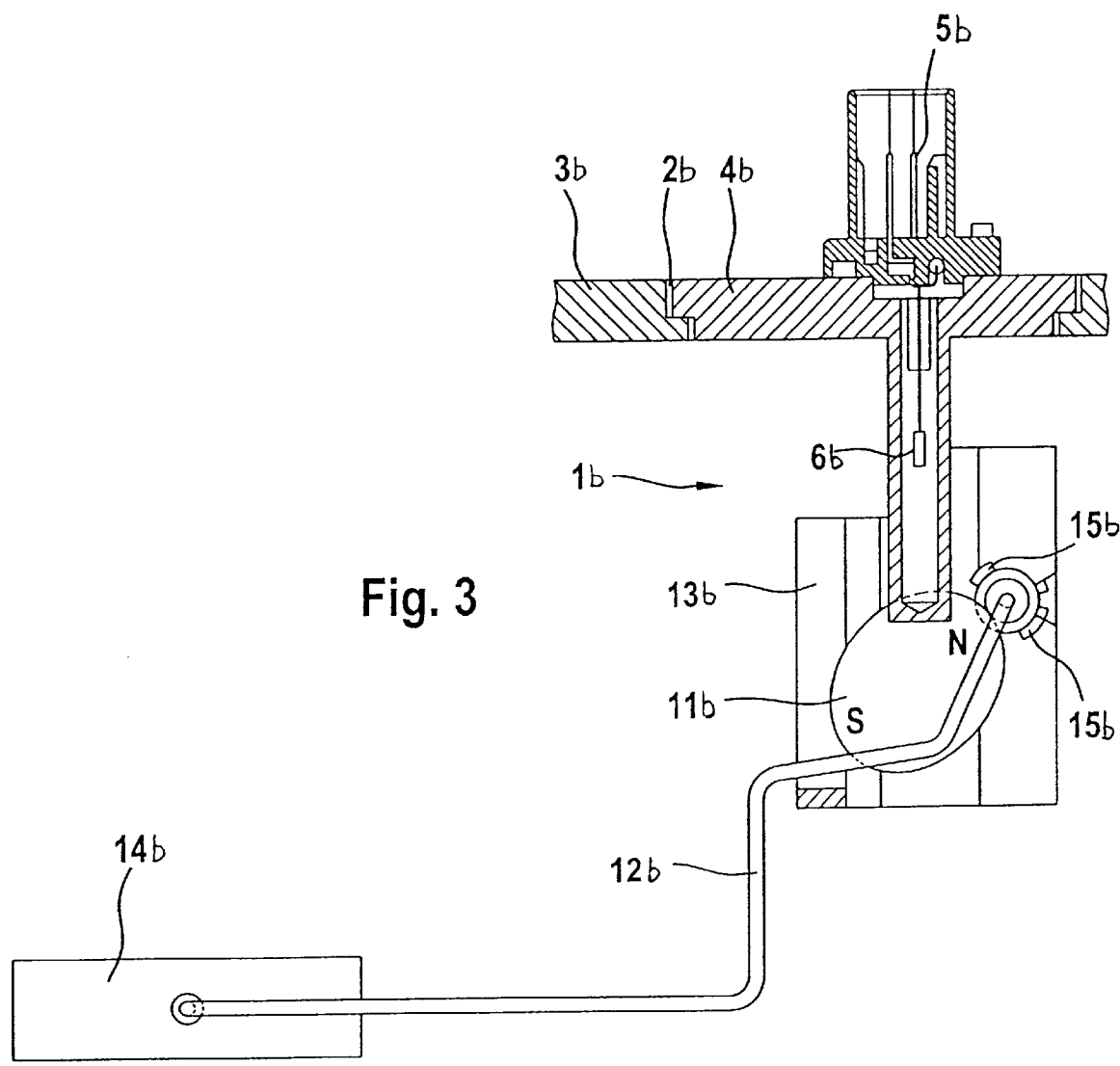
FIG. 3 is a partial side view of yet another embodiment according to the present invention of a filling level sensor.

A further embodiment of a filling level sensor 1b is illustrated in FIG. 3 in which parts corresponding to the embodiment in FIG. 1 have the same reference character with a suffix "b". The filling level sensor 1b illustrated in FIG. 3 includes a cam disk 11b made of a magnetic material with different regions of the cam disk 11b having a different polarities. The cam disk 11b is arranged with respect to a magnetic sensor 6b such that a deflection of lever arm 12b moves the cam disk 11b and changes a magnetic field at the magnetic sensor 6b. In this embodiment, the magnetic sensor 6b comprises a passive magnetic position sensor.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A filling level sensor for a liquid container, comprising:
   a support part;
   a lever arm having a first end and a second end, wherein said second end is pivotally mounted on said support part;
   a float arranged at said first end of said lever arm such that said lever arm is pivotally deflectable in response to a change in a filling level in the liquid container;
   a magnetic sensor having an output signal corresponding to the filling level in the liquid container; and
   a magnetic device having a magnetic field acting on said magnetic sensor and operatively arranged for moving in response to a pivotal deflection of said lever arm, wherein said magnetic field acting on said magnetic sensor changes during the pivotal deflection of said lever arm and thereby changes said output signal, wherein said magnetic device comprises a cam disk made of a magnetic material.

2. The filling level sensor of claim 1, wherein said magnetic sensor comprises one of a Hall element, a passive magnetic position sensor and a reed contact.

3. The filling level sensor of claim 1, wherein said cam disk comprises at least two regions having different magnetic polarities.

4. The filling level sensor of claim 1, wherein said cam disk is connected to said lever arm so that said cam disk moves in response to the deflection of said lever arm.

5. A filling level sensor for a liquid container, comprising:

a support part;

a lever arm having a first end and a second end, wherein said second end is pivotally mounted on said support part;

a float arranged at said first end of said lever arm such that said lever arm is pivotally deflectable in response to a change in a filling level in the liquid container;

a magnetic sensor having an output signal corresponding to the filling level in the liquid container;

a magnetic device having a magnetic field acting on said magnetic sensor and operatively arranged for moving in response to a pivotal deflection of said lever arm, wherein said magnetic field acting on said magnetic sensor changes during the pivotal deflection of said lever arm and thereby changes said output signal; and a cam disk arranged on said support part and connected to said lever arm so that said cam disk moves in response to the pivotal deflection of said lever arm, wherein said magnetic device comprises a magnet arranged in a movable manner for permanent contact with an end of said cam disk.

6. The filling level sensor of claim 5, further comprising a spring for urging said magnet to bear against said cam disk.

7. The filling level sensor of claim 5, further comprising a plunger arranged between said magnet and said cam disk, wherein said magnet is connected to said cam disk via said plunger.

8. The filling level sensor of claim 1, wherein said cam disk is designed in accordance with a non linear fill level to fill quantity relationship of the liquid container.

9. The filling level sensor of claim 5, wherein said cam disk is designed in accordance with a non linear fill level to fill quantity relationship of the liquid container.

* * * * *